United States Patent [19]

Ulmer et al.

[11] Patent Number: 5,886,194
[45] Date of Patent: Mar. 23, 1999

[54] HYDROXYAMINO-DERIVATIZED POLYMERS OF OLEFIN-MALEIC ANHYDRIDE IN THE FORM OF THEIR MALEIMIDE MALEAMIC ACID AND α-OLEFIN-MALEIC ANHYDRIDE HALF-ACID/HALF ESTER OR FULL ACID REPEAT UNITS PROCESS FOR MAKING SAME

[75] Inventors: Herbert W. Ulmer, Hoboken; Timothy Gillece, Pompton Plains; John A. Katirgis, West Caldwell, all of N.J.

[73] Assignee: ISP Investments Inc., Wilmington, Del.

[21] Appl. No.: 103,386

[22] Filed: Jun. 24, 1998

Related U.S. Application Data

[63] Continuation-in-part of Ser. No. 845,669, filed as PCT/US98/04240, Mar. 4, 1998.

[51] Int. Cl.$^6$ ...................... C10M 133/16; C07D 207/40
[52] U.S. Cl. ......................... 548/545; 548/546; 548/547
[58] Field of Search ...................... 548/545, 546, 548/547

[56] References Cited

U.S. PATENT DOCUMENTS 4,839,072   6/1989   Gutierrez et al. ................ 252/51.5 A

*Primary Examiner*—Johann Richter
*Assistant Examiner*—Ebenezer Sackey
*Attorney, Agent, or Firm*—Walter Katz; William J. Davis; Marilyn J. Maue

[57] ABSTRACT

This invention describes hydroxyamino-derivatized polymers of α-olefin-maleic anhydride in the form of their maleimide, maleamic acid and α-olefin-maleic anhydride half-acid/half ester or full acid repeat units process for making same. The polymers are made by reacting an α-olefin-maleic anhydride, half-acid/half-ester or full acid with a hydroxy containing α-unsubstituted primary amine in aqueous or aqueous alcoholic solution at a temperature of about 60°–160° C. during a reaction period of about 1–25 hours.

16 Claims, No Drawings

HYDROXYAMINO-DERIVATIZED POLYMERS OF OLEFIN-MALEIC ANHYDRIDE IN THE FORM OF THEIR MALEIMIDE MALEAMIC ACID AND α-OLEFIN-MALEIC ANHYDRIDE HALF-ACID/HALF ESTER OR FULL ACID REPEAT UNITS PROCESS FOR MAKING SAME

CROSS-REFERENCE TO RELATED PATENT APPLICATION

This application is a continuation-in-part of copending U.S. patent application Ser. No. 08/845,669, filed Apr. 25, 1997 and a cip of PCT/U.S. Ser. No. 98/04240 filed on Mar. 4, 1998, and assigned to the same assignee as herein.

BACKGROUND OF THE INVENTION

1. Field of the Invention

This invention relates to polymers containing hydroxymaleimide repeat units, and, more particularly, to a process for making hydroxyamino-derivatized polymers of α-olefin-maleic anhydride, half-acid/half-ester or full acid copolymers, which find application in personal care products.

2. Description of the Prior Art

Maleic anhydride can be reacted with amines to form the corresponding maleamic acid derivative. Suitably, a maleic anhydride containing polymer is reacted in solution or suspension with an amine in inert or non-reactive solvents, such as acetone, heptane, benzene or dibutylether, to provide the desired maleamic derivative.

Unfortunately, various side reactions occur during such solution or suspension processes which adversely affect the quality of the final product, particularly its color and odor. In addition, the amine reactant can form a salt with the half-acid polymer instead of reacting with the anhydride, thereby reducing the yield of the desired amide reaction product.

The reaction of amines with anhydride polymers in an inert solvent also is difficult to control because of its rapid reaction rate and high reaction exotherm leading to the formation of a non-homogeneous reaction product.

Reactions of anhydride polymers with amines in inert solvents present other problems, too. For example, if the reaction is conducted as a slurry, e.g. reaction of p(methyl vinyl ether-maleic anhydride copolymer) with an amine in toluene, the consistency of the slurry may change as the amine reacts with the anhydride polymer. This change in consistency usually results in excessive swelling of the polymer during the reaction, which can make subsequent processing very difficult unless the slurry is sufficiently diluted with solvent. However dilution reduces polymer capacity.

Reaction of an anhydride polymer with an amine as a solution in an inert solvent such as acetone is advantageous but it may result in considerable gelling or precipitation of the reaction product or the formation of "fish eyes".

As described in said copending U.S. patent application, the reaction of maleic anhydride containing polymers with amines in a reactive solvent such as ethanol produces a homogeneous product in the form of a solution or stable collodial suspension which is easy to handle even at a high solids content. Such process provides a practical route to the synthesis of amine-derivatized polymers of maleic anhydride half-acid/ester or full acid in the form of its predetermined ratios of maleamic acid and maleimide repeat units.

However, this process is not as useful for the derivatization of polymers of maleic anhydride with bifunctional amine reactants such as hydroxyamines because both of their hydroxyl and amino functionalities can react at both ends of the molecule with the maleic anhydride moiety in inert or nonreactive solvents. These secondary reactions may produce crosslinked products, which are not particularly desirable for use in personal care and pharmaceutical compositions when a solvent soluble product is desired.

Accordingly, it is an object of this invention to provide water or alcohol soluble amine derivatized maleic anhydride containing polymers which include hydroxymaleimide repeat units in a predetermined amount, with maleamic acid repeat units and α-olefin-maleic anhydride-half acid/ester or full acid repeat units, and of a process for making such polymers having little color or odor and substantially no free amine.

A feature of the invention is the provision of such advantageous polymers by carrying out the derivatizing reaction in an aqueous or aqueous-alcoholic solution as a reactive solvent.

Another feature of the invention is the provision of suitable reaction temperatures and reaction times in the process which can predetermine the ratio of the maleic anhydride half-acid/ester, maleamic acid and maleimide repeat units in the derivatized polymer obtained.

Yet another feature herein is to provide a derivatizing reaction which can be carried forward substantially to completion with little or no unwanted side reactions.

Yet another feature is a derivatization reaction which does not require an esterification or acidification catalyst, and is conducted in a non-toxic solvent.

Among the other features of the invention is the provision of a terpolymer product having little color or odor and substantially no free amine.

These and other objects and features of the invention will be made apparent from the following detailed description of the invention.

SUMMARY OF THE INVENTION

What is described herein are hydroxyamino-derivatized polymers of α-olefin-maleic anhydride half acid/ester illustrated by Formula I below: is a process of forming a polymer which includes the following repeat units:

FORMULA I

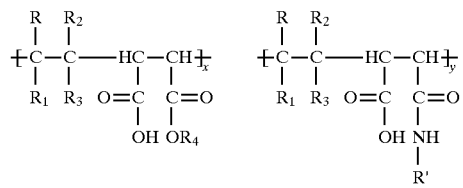

(a) half-ester or full acid    (b) malemic acid

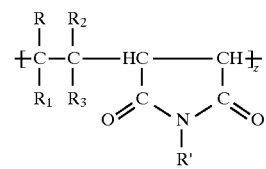

(c) maleimide where

R, $R_1$, $R_2$ and $R_3$ are selected from H, alkyl, alkoxy, cycloalkyl, aryl, ester, acid, hydroxy, hydroxyalkyl, amido, fluoro, halo and silyl, and $R_4$ is H or alkyl;

R' is derived from a hydroxy-containing α-unsubstituted primary amine, e.g. hydroxy alkylene; and mixtures with optional α-unsaturated primary amines having one or more of the following groups therein including hydrogen, and mixtures with substituted or unsubstituted aryl, alkyl, heterocyclic, aromatic, fluoro, silyl, amino, olefinic, carboxy and halogen; and x is 0–0.95, y=0–0.90 and z=0.05–1.00;

and a process for making such polymers which comprises reacting:

FORMULA II

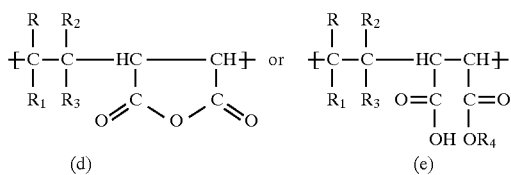

(d)    (e)

in aqueous or aqueous-alcoholic solution where R, $R_1$, $R_2$, $R_3$ and $R_4$ are as defined above, with a hydroxy α-unsubstituted primary amine, $R'NH_2$, at a temperature of about 60°–160° C., for about 1–25 hours.

In the preferred embodiments of the invention, the reaction temperature is about 100°–130° C., and the reaction time is about 2–10 hours.

A preferred starting copolymer of Formula II is an alkyl vinyl ether-maleic anhydride copolymer, such as methyl vinyl ether-maleic anhydride copolymer (MVE-MAn), or its corresponding half-ester; isobutylene-maleic anhydride copolymer (IB-MAn), or its corresponding half-ester; ethylene-maleic anhydride copolymer (ET-MAn), or its corresponding half-ester; styrene-maleic anhydride copolymer (STy-MAn); or its corresponding half-ester; propylene-maleic anhydride copolymer (Pr-MAn), or its corresponding half-ester; or vinyl pyrrolidone-maleic anhydride (VP-MAn), or its corresponding half-ester.

Preferred hydroxy amines are hydroxy-α-unsubstituted primary amines such as ethanolamine or 3-amino-1-propanol. Mixtures of hydroxyamines and monofunctional α-unsubstituted amines, such as $C_1$ to $C_{40}$ alkyl primary amines, e.g. n-hexylamine, n-octylamine, and 2-ethylhexylamine; as well as silated amines, fluorinated amines, halogenated amines, unsaturated amines, cyano amines, heterocyclic amines, aromatic amines, diamines, amino acids, amphoteric amines, and ammonia also may be used as the amine reactant.

DETAILED DESCRIPTION OF THE INVENTION

In this invention, a maleic anhydride (MAn) copolymer in an aqueous or aqueous-alcoholic solution is derivatized with a hydroxyamine to form a polymer containing predetermined amounts of repeat units of the MAn half-acid/ester or full acid, maleamic acid and maleimide repeat units. The reaction temperature and reaction period will predetermine the ratio of the above repeat units in the polymer, as described in detail in the aforementioned copending patent application.

A suitable starting material for this process is isobutylene-maleic anhydride (IB-MAn) copolymer which is available in the form of a powder. The IB-MAn copolymer is added to the aqueous-alcoholic solvent and converted to the half-acid, or full acid form. Then the desired hydroxyamine is added to the reaction mixture. The reaction mixture is further heated to give the derivatized IB-MAn copolymer having half acid/ester or full acid, maleamic acid and maleimide repeat units in a predetermined ratio.

If desired, monofunctional amines may be included in the initial solvent and anhydride powder charge prior to addition of the hydroxyamine. Then the maleamic and maleimide units are derivatized with a mixture of hydroxy and monofunctional amines.

In this process, the IB-MAn copolymer reacts in the water or water/alcohol solvent prior to addition of the hydroxyamine addition to provide a half acid/ester or full acid starting material. The hydroxyamine reaction with this half-acid/ester or full acid derivative is preferred over a direct attack on the anhydride copolymer itself because it reduces the likelihood of simultaneous reaction of both the amine and alcohol moieties of the hydroxyamine with the polymer producing crosslinked material.

In this invention, it is observed that the presence of water in the solvent also minimizes the possibility of crosslinking the reactions between polymer and hydroxyamine. While the reason for this advantageous effect is not completely understood at present, it is believed that water may hydrate the alcohol moiety to make it less reactive and/or may solubilize an intermediate salt formed between polymer and amine so that the salt does not precipitate from the reaction solution. The water component of the solvent system used herein also does not interfere with the desired conversion of maleamic acid to maleimide during the derivatization process.

To elucidate further on the mechanism of action of the starting Man polymer, in the presence of the water, water/ethanol, or ethanol the MAn polymer exists therein in equilibrium with its corresponding alkyl half-acid/ester or full acid, as shown by the equation below:

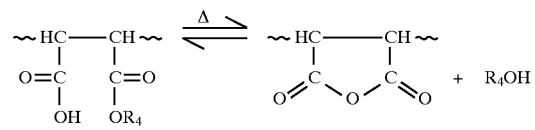

where $R_4$ is H or alkyl.

Upon heating this equilibrium reaction mixture to the desired reaction temperature, elimination of water/alcohol occurs forming the anhydride intermediate. At this point, the added hydroxyamine reactant can react with the anhydride intermediate to produce the maleamic acid and subsequent maleimide derivatives. In general, higher reaction temperatures and longer reaction times enhanced the conversion of maleamic acid into maleimide by loss of a water molecule.

The invention will now be illustrated by the following examples, in which:

EXAMPLE 1

Into a high pressure reactor was added: 60.0 g (0.390 mole) p(IB-MAn) powder (acid #280 in ethanol), 14.5 g (0.198 mole) n-butylamine and 175 g ethanol. The reaction was purged with $N_2$ gas and the temperature raised to 130° C. over 3 hours and held for 5 hours to provide the p(IB-MAn) half acid/ester. The reaction mixture then was cooled to 30° C. and 11.9 g (0.195 mole) of ethanolamine dissolved in 25 g water was added slowly to the reaction mixture. The reactor was gradually reheated to 130° C. over 3 hours and held for 5 hours. Upon cooling, a clear yellow solution was obtained. The dried polymer had an acid number of only about 35 mg KOH/g polymer. The reduced acid number indicating the predominance of the maleimide repeat unit therein over the maleamic acid unit.

EXAMPLE 2

Into a high pressure reactor was added: 154.0 g (1.00 mole) p(IB-MAn) and 326 g ethanol. The reaction was purged with $N_2$ gas and the temperature raised to 130° C. over 2 hours and held for 3 hours. The reaction mixture was cooled to which was added 28.5 g (0.379 mole) 3-amino-1-propanol and 34.82 g (0.570 mole) of ethanolamine dissolved in 181 g water. The reactor was gradually reheated to 130° C. over 3 hours and held for 8 hours. Upon cooling, a clear yellow solution was obtained. The dried polymer had an acid number of about 125 mg KOH/g polymer, indicating the presence of both maleamic acid and maleimide repeat units in the polymer.

EXAMPLE 3

Into a high pressure reactor was added: 154.0 g (1.00 mole) p(IB-MAn) and 320 g ethanol. The reaction was purged with $N_2$ gas and the temperature raised to 130° C. over 2 hours and held for 3 hours. The reaction mixture was cooled to which was added 7.51 g (0.100 mole) 3-amino-1-propanol and 51.92 g (0.850 mole) of ethanolamine dissolved in 178 g of water. The reactor was gradually reheated to 130° C. over 3 hours and held for 8 hours. The resultant product was a clear yellow solution. The dried polymer had an acid number of about 75 mg KOH/g polymer.

EXAMPLE 4

Into a high pressure reactor was added: 123 g (0.615 mole) monoethyl half ester of p(IB-MAn), 35.6 g (0.583 mole) ethanolamine, 88 g water and 199 g ethanol. The reaction was purged with $N_2$ gas and the temperature raised to 130° C. over 2 hours and held for 8 hours. The resultant product was a clear yellow solution. The dried polymer had an acid number of about 70 mg KOH/g polymer.

EXAMPLE 5

Into a high pressure reactor was added: 22.8 g (0.148 mole) p(IB-MAn), 3.33 g ethylamine (0.0517 mole) (70%), 2.96 g water and 45.62 g ethanol. The reaction was purged with $N_2$ gas and the temperature raised to 100° C. over 1 hour. Upon reaching 100° C., 5.44 g (0.0891 mole) ethanolamine dissolved in 19.85 g water was added to the reaction mixture. The reaction was held at 100° C. for 1 hour and then raised to 130° C. over 1 hour and held for an additional 8 hours. Cooling provided a clear yellow solution. The dried polymer had an acid number of only about 25 mg KOH/g polymer, indicating substantially all maleimide repeat units in the polymer.

EXAMPLE 6

Into a high pressure reactor was added: 154.0 g (1.00 mole) p(IB-MAn), 9.02 g (0.140 mole) ethylamine (70%), 10.97 g (0.150 mole) butylamine and 316 g ethanol. The reaction was purged with $N_2$ gas and the temperature raised to 130° C. over 2 hours and held for 3 hours. The reaction mixture was cooled to which was added 36.65 g (0.600 mole) of ethanolamine dissolved in 176 g of water. The reactor was gradually reheated to 130° C. over 3 hours and held for 8 hours. A clear yellow solution provided a polymer having an acid number of about 65 mg KOH/g polymer.

EXAMPLE 7

Into a high pressure reactor was added: 100 g (0.500 mole) monoethyl half ester of p(IB-MAn), 24.40 g (0.399 mole) ethanolamine, 3.66 g (0.0500 mole) butylamine, 4.63 g (0.0250 mole) dodecylamine, 84 g water and 150 g ethanol. The reaction was purged with $N_2$ gas and the temperature raised to 130° C. over 2 hours and held for 8 hours. Upon cooling the resultant product was a clear yellow solution. The dried polymer had an acid number of about 65 mg KOH/g polymer.

EXAMPLE 8

Into a high pressure reactor was added: 60.0 g (0.390 mole) p(IB-MAn) powder, 6.26 g (0.0972 mole) ethylamine (70%), 7.13 g (0.0975 mole) butylamine and 175 g ethanol. The reaction was purged with $N_2$ gas and the temperature raised to 130° C. over 3 hours and held for 5 hours. The reaction mixture was cooled to 30° C. and 11.91 g (0.195 mole) of ethanolamine dissolved in 20 g water and 30 g ethanol was added slowly to the reaction mixture. The reactor was gradually reheated to 130° C. over 3 hours and held for 5 hours. Upon cooling the resultant product was a clear yellow solution. The dried polymer had an acid number of about 45 mg KOH/g polymer.

EXAMPLE 9

60 g (0.390 mole) of a p(isobutylene-co-maleic anhydride) prepolymer and 150 g of water was charged into a 1-liter pressure reactor and purged with nitrogen. The reactor was gradually heated to 100° C. and held for 1-hour. Then the reactor was heated to 130° C. over a 1-hour period while 22.13 g (0.362 mole) ethanolamine was gradually added to the reaction mixture. Upon reaching 130° C., the reaction mixture was held for 8 hours and cooled. The product was a slight hazy, orange solution. Analysis of the product showed the presence of both maleamic acid and maleimide repeat units, with a higher molar ratio of maleamic acid units as compared to similar products obtained in an ethanol/water solvent.

Comparative Examples 10–11

EXAMPLE 10

Into a high pressure reactor was added: 100.0 g (0.793 mole) p(ethylene-MAn) powder, 14.6 g (0.200 mole) n-butylamine, 36.4 g (0.596 mole) ethanolamine and 452 g ethanol. The reaction was purged with $N_2$ gas and the temperature raised to 100° C. over 2 hours and held for 1 hour. The reaction mixture was heated to 130° C. and held for 3 hours. Upon cooling the resultant product was a white precipitate. Attempts to dissolve this material in either water or ethanol produced only gels.

EXAMPLE 11

Into a high pressure reactor was added: 100.0 g (0.793 mole) p(ethylene-MAn) powder, 43.6 g (0.596 mole) n-butylamine and 467 g ethanol. The reaction was purged with $N_2$ gas and the temperature raised to 100° C. over 1 hour and held for 10 hours. The reactor was cooled and 12.2 g (0.200 mole) ethanolamine was gradually added to the reaction mixture over 2 hours. The reaction mixture was heated to 100° C. and held for 3 hours. The reactor was then heated to 115° C. and held for 2 hours and then heated to 130° C. and held for 5 hours. Upon cooling, the resultant product precipitated from solution. The resultant dried material was insoluble in water or ethanol.

The polymers of this invention are particularly useful in personal care products.

While the invention has been described with particular reference to certain embodiments thereof, it will be understood that changes and modifications may be made which are within the skill of the art. Accordingly, it is intended to be bound only by the following claims, in which:

What is claimed is:

1. A process of forming polymers of Formula I below containing hydroxylmaleimide repeat units:

FORMULA I

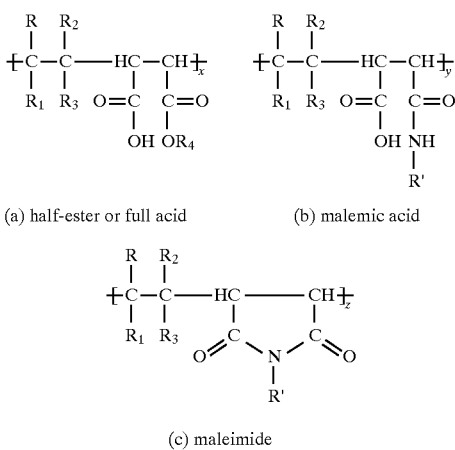

(a) half-ester or full acid  (b) malemic acid (c) maleimide where

R, $R_1$, $R_2$ and $R_3$ are selected from H, alkyl, alkoxy, cycloalkyl, aryl, ester, carboxy, hydroxy, hydroxyalkyl, amido, fluoro, halogen and silyl; and $R_4$ is H or alkyl;

R' is derived from a hydroxy-containing α-unsubstituted primary amine wherein R' also including a group derived from an α-unsubstituted primary amine having one or more of the following groups therein: hydrogen, aryl, alkyl, heterocyclic, aromatic, fluoro, silyl, amino, olefinic, carboxy and halogen; and x is 0–0.95, y=0–0.90 and z=0.05–1.00;

which comprises reacting:

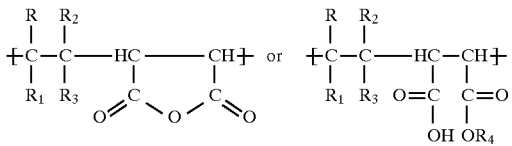

in aqueous or aqueous-alcoholic solution, where R, $R_1$, $R_2$, $R_3$ and $R_4$ are as defined above, with a hydroxy-containing α-unsubstituted primary amine, $R'NH_2$, where R' is as defined above, at a temperature of about 60°–160° C., for a reaction period of about 1–25 hours.

2. A process according to claim 1 wherein the reaction temperature is about 80°–150° C.

3. A process according to claim 1 wherein the reaction temperature is about 100°–130° C.

4. A process according to claim 1 wherein the reaction time is about 1–25 hours.

5. A process according to claim 1 wherein the reaction time is about 2–10 hours.

6. A process according to claim 1 wherein R' is synthesized by reaction with ethanolamine.

7. A process according to claim 1 wherein R' is synthesized by reaction with 3-amino-1-propanol.

8. A process according to claim 1 wherein R is alkyl and $R_1$, $R_2$ and $R_3$ are H.

9. A process according to claim 1 wherein R and $R_1$ are alkyl and $R_2$ and $R_3$ are H.

10. A process according to claim 1 wherein R is alkoxy and $R_1$, $R_2$ and $R_3$ are H.

11. A process according to claim 1 wherein R is amide and $R_1$, $R_2$ and $R_3$ are H.

12. A process according to claim 1 wherein $R_4$ is H.

13. A process according to claim 1 wherein $R_4$ is alkyl.

14. A process according to claim 1 wherein

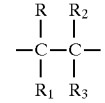

is derived from ethylene, propylene, isobutylene, methylvinyl ether, styrene or vinyl pyrrolidone.

15. A process according to claim 1 in which said optional amine is present.

16. The polymer product of the process of claim 1.

* * * * *